April 29, 1969    G. W. ROGERS    3,441,285
ICE VELOCIPEDE
Filed Sept. 18, 1967
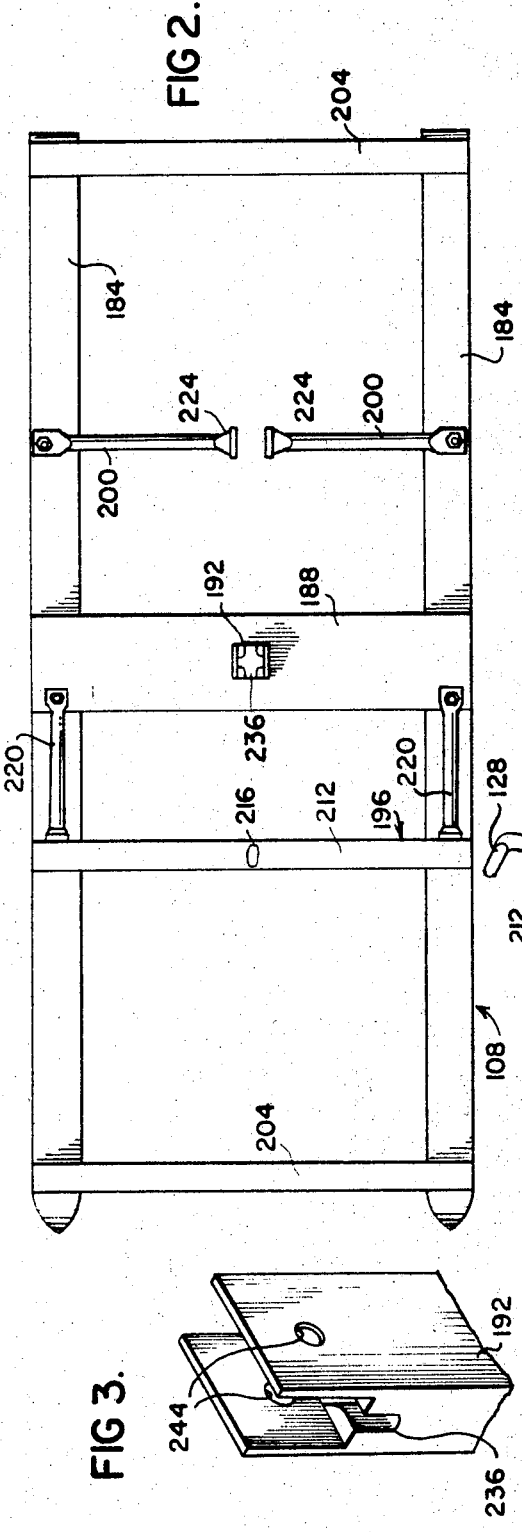
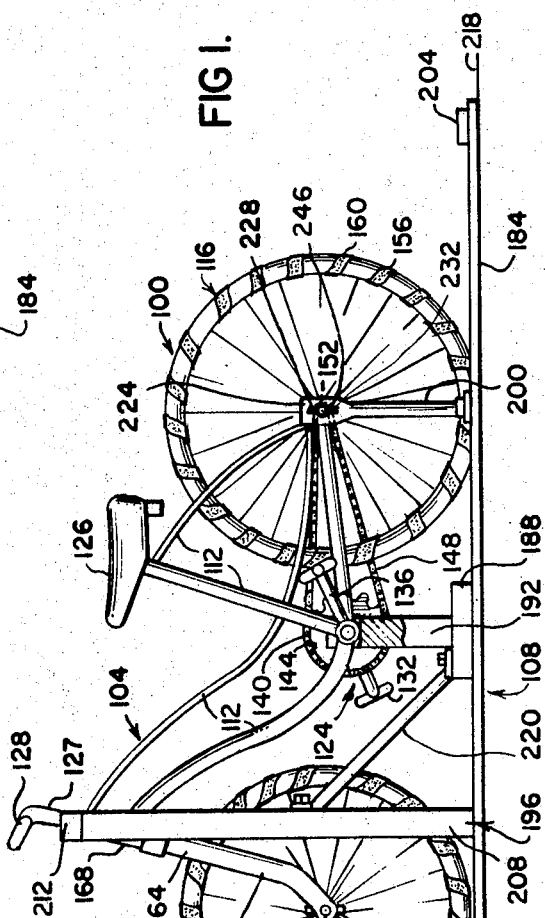
GEORGE W. ROGERS
INVENTOR.
BY McLean Morton and Boustead
ATTORNEYS

United States Patent Office 3,441,285
Patented Apr. 29, 1969

3,441,285
ICE VELOCIPEDE
George W. Rogers, Easton, Conn., assignor to Goodwill Industries of Western Connecticut, Inc., Bridgeport, Conn., a corporation of Connecticut
Filed Sept. 18, 1967, Ser. No. 668,477
Int. Cl. A63c 17/18; B62k 13/02
U.S. Cl. 280—7.12                                    6 Claims

ABSTRACT OF THE DISCLOSURE

An ice velocipede for use on frozen surfaces consists of an ice carriage and a detachable bicycle having a rear driving wheel and a front steering wheel. The ice carriage has a pair of parallel runners connected together by several cross members, a center one of which serves as a support and pivot point for the bicycle with the other members holding the bicycle upright while permitting the bicycle to pivot to place either the rear driving wheel or the front steering wheel or neither wheel into engagement with the frozen surface. The front wheel may be replaced by a runner and the rear wheel is provided with spikes to engage the frozen surface.

BACKGROUND OF THE INVENTION

Field of the invention

This invention relates to an ice velocipede, or more particularly to a velocipede which can be driven on ice or other frozen surfaces.

Description of the prior art

Velocipedes or light vehicles, such as bicycles, propelled by the rider which can be driven on frozen surfaces are well known. One such vehicle, comprised of a bicycle having runners attached to each wheel and spiked vibrating propellers pivoted at the central axis of the driving wheel to provide manual means of locomotion, is disclosed in U.S. Patent No. 95,521. U.S. Patent Nos. 490,240, 504,265, 521,496 and 554,346 describe other bicycles adapted to travel on ice or icy surfaces. In general, these ice velocipedes incorporating a bicycle have a chain-driven rear wheel, spikes embodied in or attached to the rear tire, runners attached to both wheels and means of steerage provided by a conventional, movable front wheel. Still another ice velocipede is described in U.S. Patent No. 524,349 whereby the rear runner can be manually raised or lowered during movement of the velocipede so as to engage or disengage the spiked rear tire with the ice surface. The device to achieve this engagement or disengagement is complex and requires the rider to remove a hand from the steering bar in order to strenuously manipulate a lever. In general, the known velocipedes which are suitable for travel on frozen surfaces are (a) relatively unstable structures, particularly during such maneuvers as simple turns, (b) the parts placed on the bicycle are often extremely complicated in structure, (c) the added parts often require quite a bit of time and manual dexterity to install on a bicycle.

SUMMARY OF THE INVENTION

This invention provides an ice carriage for mounting a bicycle. It includes:
(a) Two runners which are in approximately parallel and rigid alignment;
(b) Cross members interconnecting the runners;
(c) A center support post which is mounted on a cross member and which contains a pivot slot wherein the pedal journal of the bicycle is cradled;
(d) A front elevated mounting bracket, positioned forward of the support, composed of two vertical members, one attached to each of said runners and a horizontal member connected to the tops of the vertical members and which contains a central, elongated vertical slot which is adapted to loosely receive the bicycle handle bar post; and
(e) Two rear supports, positioned behind the post, each support being connected at one end to a runner and at the other end to the rear wheel axle. The connection between each rear support and the axle is accomplished using an elongated vertical slot which allows vertical movement of the rear wheel axle.

A bicycle is mounted on the ice carriage by removing the handle bars and positioning the pedal journal upon the center support post. The handle bars are repositioned upon the bicycle with the stem of the handle bars passing through the front elevated mounting bracket of the ice carriage. The two rear supports of the ice carriage are then connected to the rear axle of the bicycle. The height of the support post of the ice carriage is greater than the normal height of the pedal journal above the ground and therefore the bicycle may be maintained in one of three positions. It may be rocked backward to effect contact between the rear wheel and the ground surface, it may be rocked forward to effect contact between the front wheel and the ground surface or it may be maintained in a horizontal position with neither wheel of the bicycle touching the ground. The rearward position is used for accelerating the ice carriage, the forward position is used for steering the ice carriage and the horizontal position is used for coasting.

Although an ice or icy surface is preferred, my invention can also be used on any surface which could normally be traversed by persons on devices having runners, blades, or slides, e.g., on snow.

This invention encompasses the use of a bicycle mounted on the ice carriage, but is not restricted to the modern-type of bicycle. Any type of device that provides driving ice-contact means in the rocked-back position and guidance ice-contact means in the rocked-forward position will suffice. Examples include the replacement of the front wheel by a runner or runners, or the substitution of two wheels for the rear driving wheel.

The rear or driving wheel should contain some means for enhancing traction on the slippery surface such as a skid chain or spikes around its outer circumference. The spikes can be embedded in the tire. Preferably spikes are embedded in or firmly attached to a flexible belt-like material which can be helically wrapped around the rear tire. This type of arrangement allows use of a normal rear wheel.

The runners on the ice carriage portion of the velocipede can be of any suitable design and constructed from any suitable material, such as, wood, metal, plastic. Skis are particularly suitable as runners. The invention encompasses the use of two or more runners.

BRIEF DESCRIPTION OF THE DRAWINGS

FIG. 1 is a side elevation view of the ice velocipede, namely, a bicycle mounted in the ice carriage;
FIG. 2 is a top elevation view of the ice carriage by itself; and
FIG. 3 is an enlarged perspective view of the top portion of the bicycle support post of the ice carriage shown in FIGS. 1 and 2.

DETAILED DESCRIPTION

Referring to FIG. 1, which illustrates the preferred embodiment of the ice velocipede, the numeral 100 represents an ice velocipede which is comprised of bicycle 104 and ice carriage 108. Bicycle 104 includes a frame 112, a rear wheel 116, a front wheel 120, a pedal arrangement 124, a seat 126, and a handle bar 128. Pedal arrangement 124 consists of two pedals 132 mounted on arms 136 which extend from a sprocket 140 and rotate about pedal journal 144 in frame 112. Pedal arrangement 124 is coactingly connected to rear wheel 116 by means of chain 148 which traverses a rear sprocket 152 connected to rear wheel 116 and pedal sprocket 140. Rear wheel 116 is helically wrapped with tape 156 which contains outwardly directed spikes 160.

The stem 127 of handle bar 128 is attached to fork 164 which is pivotally mounted in casing 168 of frame 112. Front wheel 120 is rotatably mounted on the twin prongs 172 of fork 164 by front axle 176. Front tire 120 is helically wrapped with tape 180 which contains outwardly directed spikes 184.

As best shown in FIG. 2, ice carriage 108, includes runners 184, cross board 188, central support post 192 mounted on cross board 188, front elevated mounting bracket 196, two rear supports 200 and cross bars 204. Runners 184 are spaced apart and approximately parallel in alignment. Cross board 188 and cross bars 204 are connected across runners 184 to give ice carriage 108 structural stability; cross board 188 is located at about the center of runners 184 while cross bars 204 are located close to each end.

Front elevated mounting bracket 196 is mounted on runners 184 in front of cross board 188. Front mounting bracket 196 is comprised of two side posts 208, one of which is perpendicularly mounted on each of runners 184, and top bar 212, which is attached to the top of both side posts 208. Top bar 212 contains an elongated central slot 216 which is aligned approximately parallel to runners 184. Slot 216 is adapted to loosely receive stem 127 of handle bar 128 and to permit movement of stem 127 parallel to runners 184. Support bars 220 are attached to side posts 208 for added stability of front mounting bracket 196. Rear supports 200 are each comprised of an elongated member 221 and a plate or affixing member 224. Each member 221 is attached at one end to a different runner 184 from which it extends angularly upward toward the center of ice carriage 108 and the other end is vertical so that the two ends are positioned in a spaced and confronting relationship to each other. Plates 24 are affixed to the confronting ends of members 221 and each contains an elongated, somewhat vertical aperture 228. Axle 232 of wheel 116 projects through both apertures 228 which are preferably curved to facilitate the movement of axle 232, said movement actually being slightly curved forward. Apertures 228 are so positioned that the rear wheel can reach to the lower plane of runners 184 when bicycle 104 is in the rear rocking position, which will be detailed below.

Central support post 192, as best seen in FIG. 3, contains pivot slot 236. Slot 236 is designed to cradle pedal journal 144 and thereby support bicycle 104. Slot 236 is appropriately shaped and positioned to allow slight rotation of bicycle 104 from a rearward position in which only the rear wheel 116 touches the surface below to a forward position in which only the front wheel 120 touches that surface. It is important that slot 136 be properly shaped to give constant support during rotation of bicycle 104 in relation to which it acts as a fulcrum.

The sides of center post 192 extend above slot 236 and include a pair of axially aligned apertures 244 each adapted to receive an arm 136 of pedal arrangement 124.

In order to assemble bicycle 104 on ice carriage 108, handle bar 128 is removed and pedal journal 144 is placed on support post 192 with arms 136 extending through apertures 244. Stem 127 of handle bar 128 is then passed through aperture 216 and attached to fork 164. Rear axle 232 is then passed through apertures 228 and a pair of hex nuts 246 are screwed on axle 232 in such manner as will not hinder movement of axle 232 and plates 224 relative to each other.

In operation, the ice velocipede rider sits back in seat 126 so that his weight causes rear wheel 16 to contact icy surface 218. This is designated the back rocking position. Ice velocipede 100 can then be propelled forward by operation of the pedals by the rider. Then the rider can shift his weight forward, causing rear wheel 116 to lift off of icy surface 218 and causing front wheel 120 to contact icy surface 218. This is designated the front rocking position. Ice velocipede 100 can then be steered by use of the handlebars. The rider can then resume the back rocking position for either deceleration or for further acceleration. The bicycle can also be moved to a third, horizontal position at which neither wheel touches icy surface 218; this position is used for coasting.

While I have described above the preferred embodiment of my invention it will be obvious that certain modifications of the structure described can be made. For example, the center post can be so designed that slot 236 supports bicycle 104 with both wheels touching the surface below, and the ice velocipede is then used without rotation of bicycle 104. When this construction is used the connection between bicycle 104 and front mounting bracket 196 and rear supports 200 can be fixed.

Also as mentioned above front wheel 120 can be replaced by a movable runner which can be adapted as an extension to the standard bicycle fork 164.

It is claimed:
1. An ice carriage for mounting a bicycle comprising a frame including a pedal journal, a rear wheel mounted on said frame to rotate upon an axle, rear wheel drive means and front guidance means mounted on said frame, said ice carriage being comprised of:
   (a) a plurality of runners in fixed parallel relationship to each other;
   (b) a cross board attached to and interconnecting each of said runners;
   (c) a support post mounted on said cross board adapted to receive and support the pedal journal of said bicycle;
   (d) a front elevated mounting bracket, positioned across said runners displaced from said cross board toward one end of said runners and having an elongataed slot aligned approximately parallel to said runner means and adapted to receive said front guidance means; and
   (e) rear support means, each connected to a runner at a point displaced from said cross board toward the other end of said runners and adapted to be connected movably to the rear of the bicycle frame.

2. The ice carriage in claim 1 wherein there is at least one cross bar attached to each of said runners whereby said runners are held in alignment.

3. The ice carriage of claim 1 wherein said support post is adapted to support said pedal journal at a height at which the rear wheel of said bicycle and the front guidance means cannot both contact a horizontal plane passing through the bottom of the runners simultaneously.

4. An ice velocipede for travel on a frozen surface, wherein a bicycle, comprising a frame including a pedal journal, a rear wheel mounted on said frame to rotate upon an axle, rear wheel drive means and front guidance means mounted on said frame, is mounted on an ice carriage, comprised of:
   (a) a plurality of runners in fixed parallel relationship to each other;
   (b) a cross board attached to and interconnecting each of said runners;
   (c) a support post mounted on said cross board adapted to receive and support the pedal journal of said bicycle;
   (d) a front elevated mounting bracket, positioned across said runners displaced from said cross board toward one end of said runners and having an elongated slot aligned approximately parallel to said runner means; and (e) rear support means, each connected to a runner at a point displaced from said cross board toward the other end of said runners;

said bicycle being mounted on said ice carriage with the pedal journal supported by the support post and the front guidance means passing through the elongated slot of the front elevated mounting bracket and the rear wheel axle movably connected to the rear support means.

5. The ice velocipede of claim 4 wherein the front guidance means consists of (a) a center shaft, pivotally attached to the front portion of said bicycle frame, (b) handle bars attached to said center shaft whereby the ice velocipede is guided, and (c) a wheel rotatably mounted on the bottom portion of said center shaft.

6. The ice velocipede of claim 4 wherein the support post supports the pedal journal of said bicycle at a height at which the rear wheel of said bicycle and the front guidance means cannot both contact a horizontal plane passing through the bottom of the runners simultaneously.

References Cited

UNITED STATES PATENTS

| 95,521 | 10/1869 | Searing | 280—7.12 |
| 490,240 | 1/1893 | Bendure et al. | 280—7.12 |
| 504,265 | 8/1893 | Bouse | 280—7.12 |
| 521,496 | 6/1894 | Grieneisen | 280—7.12 |
| 524,349 | 8/1894 | Putrow | 280—7.12 |
| 554,346 | 2/1896 | Von Otto | 280—7.12 |
| 755,170 | 3/1904 | Reed | 280—7.14 |
| 1,010,389 | 11/1911 | Knecht | 280—7.14 |
| 1,399,643 | 12/1921 | Nagy | 280—12.14 |
| 2,978,251 | 4/1961 | Gerdes | 280—7.14 X |

LEO FRIAGLIA, *Primary Examiner.*

MILTON L. SMITH, *Assistant Examiner.*